United States Patent
Fukuda et al.

(10) Patent No.: US 8,385,606 B2
(45) Date of Patent: Feb. 26, 2013

(54) IMAGE PROCESSING APPARATUS AND METHOD, AND PROGRAM

(75) Inventors: Takeshi Fukuda, Chiba (JP); Tamaki Kojima, Tokyo (JP)

(73) Assignee: Sony Corporation, Tokyo (JP)

( * ) Notice: Subject to any disclaimer, the term of this patent is extended or adjusted under 35 U.S.C. 154(b) by 943 days.

(21) Appl. No.: 11/496,551

(22) Filed: Aug. 1, 2006

(65) Prior Publication Data
US 2006/0274978 A1 Dec. 7, 2006

(30) Foreign Application Priority Data
Aug. 5, 2005 (JP) ................ P2005-227526

(51) Int. Cl.
*G06K 9/00* (2006.01)
*G06K 9/62* (2006.01)
*G06K 9/54* (2006.01)

(52) U.S. Cl. ........ 382/118; 382/115; 382/180; 382/224; 382/305; 382/306

(58) Field of Classification Search .......... 382/115, 382/118, 180, 224, 305; 707/104.1
See application file for complete search history.

(56) References Cited

U.S. PATENT DOCUMENTS

| | | | |
|---|---|---|---|
| 6,035,055 A * | 3/2000 | Wang et al. ............ | 382/118 |
| 7,212,233 B2 * | 5/2007 | Nakamura ............ | 348/221.1 |
| 7,362,919 B2 * | 4/2008 | Das et al. ............ | 382/284 |
| 7,620,242 B2 * | 11/2009 | Enomoto et al. ............ | 382/167 |
| 7,716,157 B1 * | 5/2010 | Bourdev et al. ............ | 1/1 |
| 2005/0213793 A1 * | 9/2005 | Oya et al. ............ | 382/103 |
| 2006/0177110 A1 * | 8/2006 | Imagawa et al. ............ | 382/118 |

FOREIGN PATENT DOCUMENTS

| | | |
|---|---|---|
| CN | 1545254 A | 11/2004 |
| CN | 1679318 A | 10/2005 |
| JP | 10-124655 | 5/1998 |
| JP | 2000-206608 | 7/2000 |
| JP | 2001-167110 | 6/2001 |
| JP | 2002-335487 | 11/2002 |
| JP | 2003-150528 | 5/2003 |
| JP | 2004-062868 | 2/2004 |
| JP | 2004-227158 | 8/2004 |
| JP | 2004-228637 | 8/2004 |
| JP | 2004-318603 | 11/2004 |
| JP | 2005-157463 | 6/2005 |
| WO | WO 2005/057489 | 6/2005 |

OTHER PUBLICATIONS

Sun et al. ("MyPhotos—A system for home photo management and processing", Proc 1oth ACM, 2002, pp. 81-82).*

"Kao, Teroppu kara Kansei made Soudouin de 1000 Jikan wo Shiboru" ("Define 1,000 Hours on the Basis of All Elements, Such as Faces, Subtitles, and Shouts") in Nikkei Electronics; published by Nikkei Business Publications, Inc.; Jul. 21, 2004; pp. 114-123.

(Continued)

*Primary Examiner* — Tom Y Lu
*Assistant Examiner* — Thomas Conway
(74) *Attorney, Agent, or Firm* — Finnegan, Henderson, Farabow, Garrett & Dunner LLP

(57) ABSTRACT

An image processing apparatus includes detecting means for detecting the number of face image elements, which are one or more image elements of faces, included in an image, and associating means for associating the image with the detected number of face image elements.

11 Claims, 16 Drawing Sheets

OTHER PUBLICATIONS

"Cell Tanjou" ("Birth of Cells") in Nikkei Electronics; published by Nikkei Business Publications, Inc., Feb. 28, 2005; pp. 89-117.

Communication issued from Chinese Patent Office, dated Dec. 7, 2007, in counterpart foreign patent application No. 2006101042454.

Communication issued from Japan Patent Office, dated Dec. 14, 2010, in counterpart JP Patent Application No. 2005-227526 (3 pages).

Masayuki Mukunoki et al., "A Retrieval Method of Outdoor Scenes Using Object Sketch and an Automatic Index Generation Method," The Transactions of the Institute of Electronics, Information, and Communication Engineers D-II, Jun. 1996, pp. 1025-1033, vol. J79-D-II, No. 6.

Communication issued from Japan Patent Office, dated Mar. 1, 2011, in counterpart JP Patent Application No. 2005-227526 (2 pages).

Office Action issued on May 25, 2011 in corresponding Chinese Patent Application No. 10104245.4 (6 pages).

Official communication issued by Chinese Patent Office, mailed May 18, 2010 for counterpart Chinese Patent Application No. 200610104245.4 (6 pages).

* cited by examiner

FIG. 8

| NAME OF TEMPLATE | THE NUMBER OF FACES | POSITION OF FACE | SIZE | ORIENTATION |
|---|---|---|---|---|
| PORTRAIT | 1 | CENTER OF IMAGE | LARGE | FRONT |
| TWO-SHOT PHOTOGRAPH | 2 - 3 | VICINITY OF THE CENTER OF IMAGE | LARGE - MEDIUM | FRONT OR FACE EACH OTHER |
| GROUP PHOTOGRAPH | 8 - 13 | UPPER HALF OF IMAGE, DISPERSE IN CROSSWISE DIRECTION | SMALL | FRONT |
| LANDSCAPE PHOTOGRAPH | 0 (THE NUMBER OF FACES IS NOT COUNTED DEPENDING ON SIZE AND ORIENTATION) | NO RESTRICTION | THE NUMBER OF SMALL SIZED FACES IS NOT COUNTED | THE NUMBER OF SIDEWAYS FACES IS NOT COUNTED |

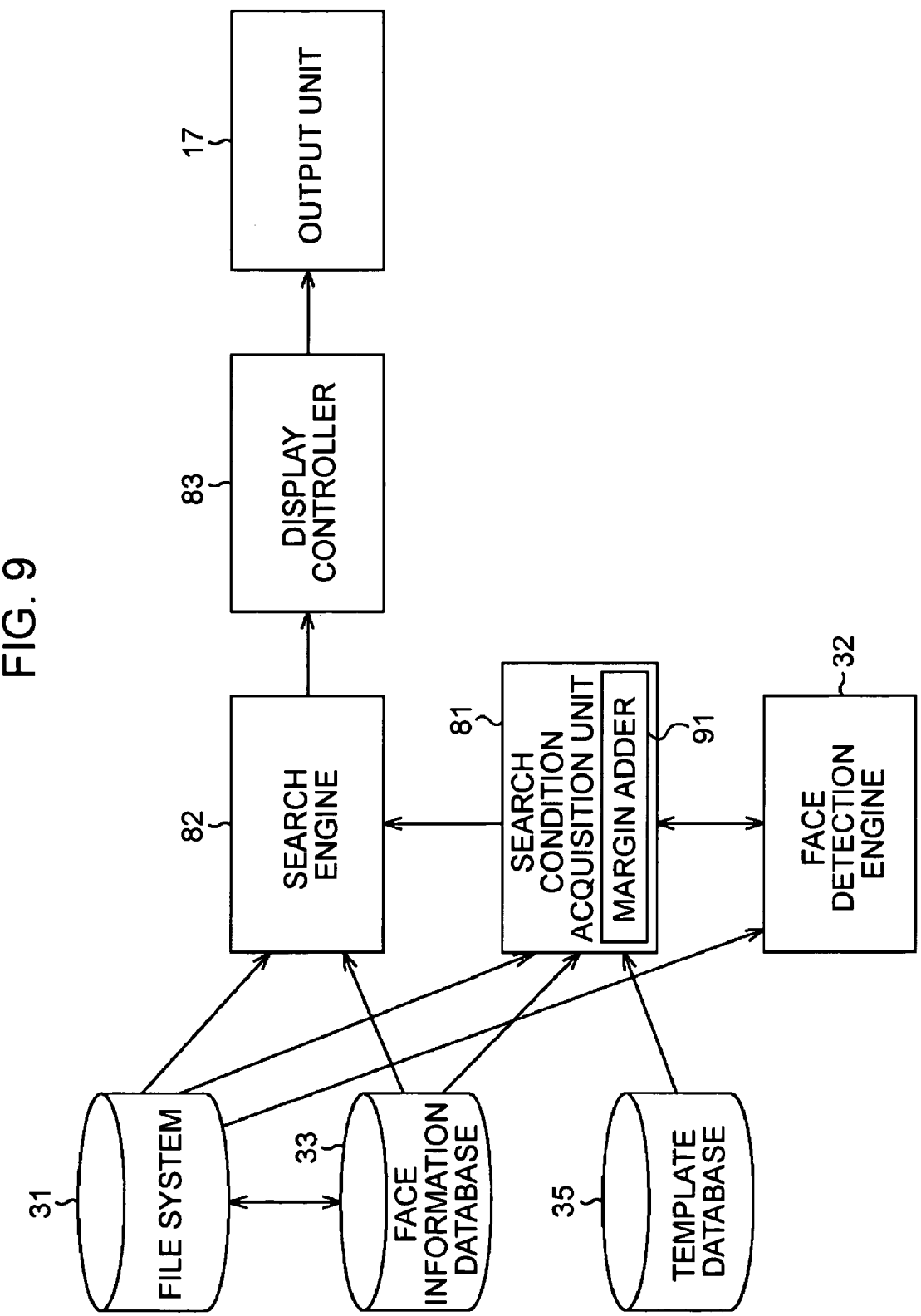

IMAGE PROCESSING APPARATUS AND METHOD, AND PROGRAM

CROSS REFERENCES TO RELATED APPLICATIONS

The present invention contains subject matter related to Japanese Patent Application JP 2005-227526 filed in the Japanese Patent Office on Aug. 5, 2005, the entire contents of which are incorporated herein by reference.

BACKGROUND OF THE INVENTION

1. Field of the Invention

The present invention relates to image processing apparatuses, image processing methods, and programs, and more particularly, to an image processing apparatus, an image processing method, and a program that associate an image with information that enables easier search.

2. Description of the Related Art

Many methods for detecting regions of human faces (face image elements) included in images have been suggested. In addition, various uses, such as detection of human beings using monitoring cameras and detection of scenes in moving images, have been suggested, for example, in "Kao, Teroppu kara Kansei made Soudouin de 1000 Jikan wo Shiboru" ("Define 1,000 Hours on the Basis of All Elements, Such as Faces, Subtitles, and Shouts") in Nikkei Electronics published by Nikkei Business Publications, Inc., issued on Jun. 21, 2004, pp. 114-123.

However, such uses have been aimed at limited transaction, and uses in daily life, such as personal life or family life, have not been suggested.

In such a situation, so-called digital still cameras have become widely used, and a function to photograph static images is provided in cellular phone units. Thus, chances to photograph static images (photographs) in daily life are steadily increasing.

It is very troublesome to manage static images photographed in daily life. Thus, users who photograph static images spend time and effort to classify the static images. For example, users cause static images to be displayed on the basis of so-called calendar display in accordance with the dates added to the respective static images, add notes of text input by themselves to the respective static images, or store the static images into corresponding folders determined in advance by themselves.

In order to view static images as a meaningful album or to view static images photographed in a similar situation in chronological order, it is necessary for users to perform such management.

When extracting only a static image including a face from among a vast number of static images (photographs), a user opens folders sequentially to reach a folder storing a desired static image, opens the static image stored in the folder, and checks the contents of the static image. In this case, in order to reach the folder storing the desired static image, it is necessary for the user to perform bothersome operations in order (to open proper folders in proper order).

A technology for controlling photographing such that a face is detected when photographing is performed in order to perform appropriate photographing is suggested. However, adding a tag indicating that the number of faces included in a photographed static image (photograph) and using the tag for searching for a group photograph has not been suggested.

SUMMARY OF THE INVENTION

As described above, enormous time and effort is necessary to classify and manage static images (photographs). In addition, it is very difficult to find a desired static image from among many static images unless such time and effort is spent.

It is desirable to search for a desired image easily with less time and effort.

An image processing apparatus, an image processing method, and a program according to an embodiment of the present invention include a detecting means/step that detects the number of face image elements, which are one or more image elements of faces, included in an image, and an associating means/step that associates the image with the detected number of face image elements.

According to an embodiment of the present invention, the number of face image elements, which are one or more image elements of faces, included in an image is detected, and the image is associated with the detected number of face image elements.

The detecting means may further detect the size of each of the face image elements. The associating means may associate the image with the detected number of face image elements and the detected size of each of the face image elements.

The detecting means may further detect the position of each of the face image elements. The associating means may associate the image with the detected number of face image elements and the detected position of each of the face image elements.

The detecting means may further detect the orientation of a face of each of the face image elements. The associating means may associate the image with the detected number of face image elements and the detected orientation of the face of each of the face image elements.

The image processing apparatus may further include generating means for generating a label indicating the category of the image on the basis of the number of face image elements included in the image and a reference value stored in advance. The associating means may associate the image with the label.

The image processing apparatus may further include searching means for searching for the image on the basis of the label associated with the image, and display control means for controlling display of the found image.

The searching means may search for the image associated with a label similar to a label specified by an icon selected by a user.

The searching means may search for the image associated with a label similar to a label associated with an image selected by a user.

The image processing apparatus may further include searching means for searching for the image including at least one face image element, the number of face image elements corresponding to a reference value, from among a plurality of reference values stored in advance, specified by an icon selected by a user, and display control means for controlling display of the found image.

The searching means may search for the image including the at least one face image element, the number of face image elements being within a predetermined range based on the reference value specified by the icon.

The image processing apparatus may further include searching means for searching for the image including at least one face image element, and display control means for controlling display of the found image. The detecting means may detect the number of face image elements included in an image selected by a user. The number of face image elements included in the found image may correspond to the number of face image elements included in the selected image.

The searching means may search for the image including the at least one face image element, the number of face image elements being within a predetermined range based on the number of face image elements included in the selected image.

As described above, an image can be associated with information.

In addition, a desired image can be searched for easily with less time and effort.

BRIEF DESCRIPTION OF THE DRAWINGS

FIG. 8 shows examples of templates;

FIG. 9 is a block diagram showing the structure of an image search function;

DESCRIPTION OF THE PREFERRED EMBODIMENTS

Figure 1:
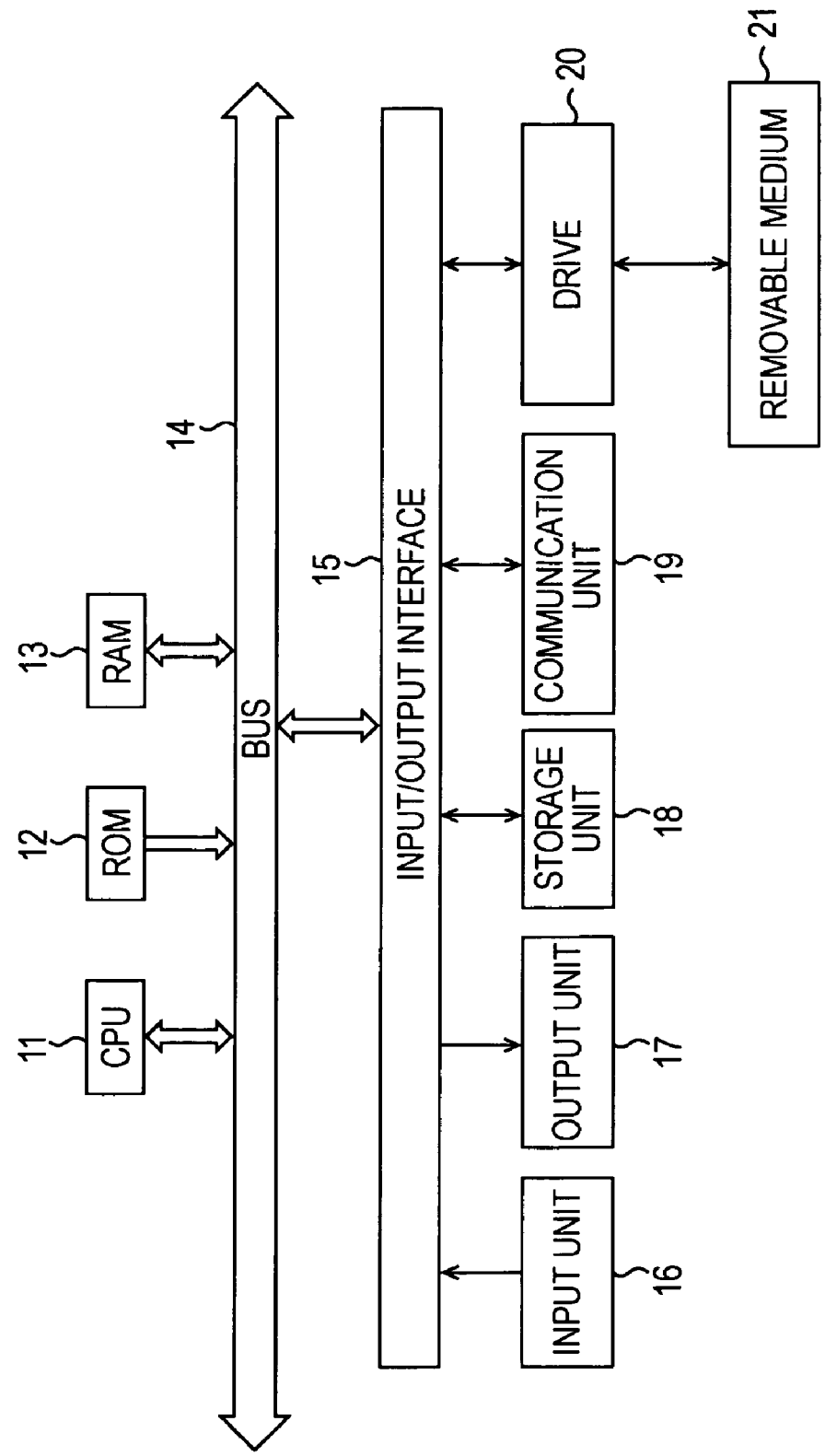
FIG. 1 is a block diagram showing an example of the structure of an image processing apparatus according to an embodiment of the present invention.

Before describing preferred embodiments of the present invention, the correspondence between the features of the present invention and embodiments described in the description of the preferred embodiments will be discussed below. This description is intended to assure that embodiments supporting the invention are described in the description of the preferred embodiments. Thus, even if an embodiment described in the description of the preferred embodiments is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

An image processing apparatus according to an embodiment of the present invention includes detecting means (for example, a face detection engine 32 shown in FIG. 2) for detecting the number of face image elements, which are one or more image elements of faces, included in an image, and associating means (for example, a face information database 33 shown in FIG. 2) for associating the image with the detected number of face image elements.

The image processing apparatus further includes generating means (for example, a labeling unit 34 shown in FIG. 2) for generating a label indicating the category of the image on the basis of the number of face image elements included in the image and a reference value stored in advance. The associating means associates the image with the label.

The image processing apparatus further includes searching means (for example, a search engine 82 shown in FIG. 9) for searching for the image on the basis of the label associated with the image, and display control means (for example, a display controller 83 shown in FIG. 9) for controlling display of the found image.

The image processing apparatus further includes searching means (for example, the search engine 82 shown in FIG. 9) for searching for the image including at least one face image element, the number of face image elements corresponding to a reference value, from among a plurality of reference values stored in advance, specified by an icon selected by a user, and display control means (for example, the display controller 83 shown in FIG. 9) for controlling display of the found image.

An image processing method and program according to an embodiment of the present invention includes the steps of detecting (for example, step S11 in FIG. 3) the number of face image elements, which are one or more image elements of faces, included in an image, and associating (for example, step S13 in FIG. 3) the image with the detected number of face image elements.

The present invention is applicable, for example, to an apparatus handling an image, such as a personal computer, a digital still camera, a portable terminal device, or a cellular phone unit.

FIG. 1 is a block diagram showing an example of the structure of an image processing apparatus, which is a personal computer, according to an embodiment of the present invention. A central processing unit (CPU) 11 performs various types of processing in accordance with a program stored in a read-only memory (ROM) 12 or a storage unit 18. A program executed by the CPU 11 and data are appropriately stored in a random-access memory (RAM) 13. The CPU 11, the ROM 12, and the RAM 13 are connected to each other via a bus 14.

A cell described in "Cell Tanjou" ("Birth of Cells") in Nikkei Electronics published by Nikkei Business Publications, Inc., issued on Feb. 28, 2005, pp. 89-117 can be adopted as the CPU 11.

An input/output interface 15 is connected to the CPU 11 via the bus 14. An input unit 16 including a keyboard, a mouse, a microphone, a digital still camera, and the like and an output unit 17 including a display, a speaker, and the like are connected to the input/output interface 15. The CPU 11 performs various types of processing in accordance with an instruction input from the input unit 16. The CPU 11 outputs a processing result to the output unit 17.

The storage unit 18 connected to the input/output interface 15 is, for example, a hard disk. The storage unit 18 stores a program executed by the CPU 11 and various data. A communication unit 19 communicates with an external apparatus via a network, such as the Internet or a local area network.

A program may be acquired via the communication unit 19 and may be stored in the storage unit 18.

When a removable medium 21, such as a magnetic disc, an optical disc, a magnetic optical disc, or a semiconductor memory, is installed, a drive 20 connected to the input/output interface 15 drives the removable medium 21, and acquires a program and data recorded on the removable medium 21. The acquired program and data are transferred to and stored in the storage unit 18 when necessary.

Figure 2:
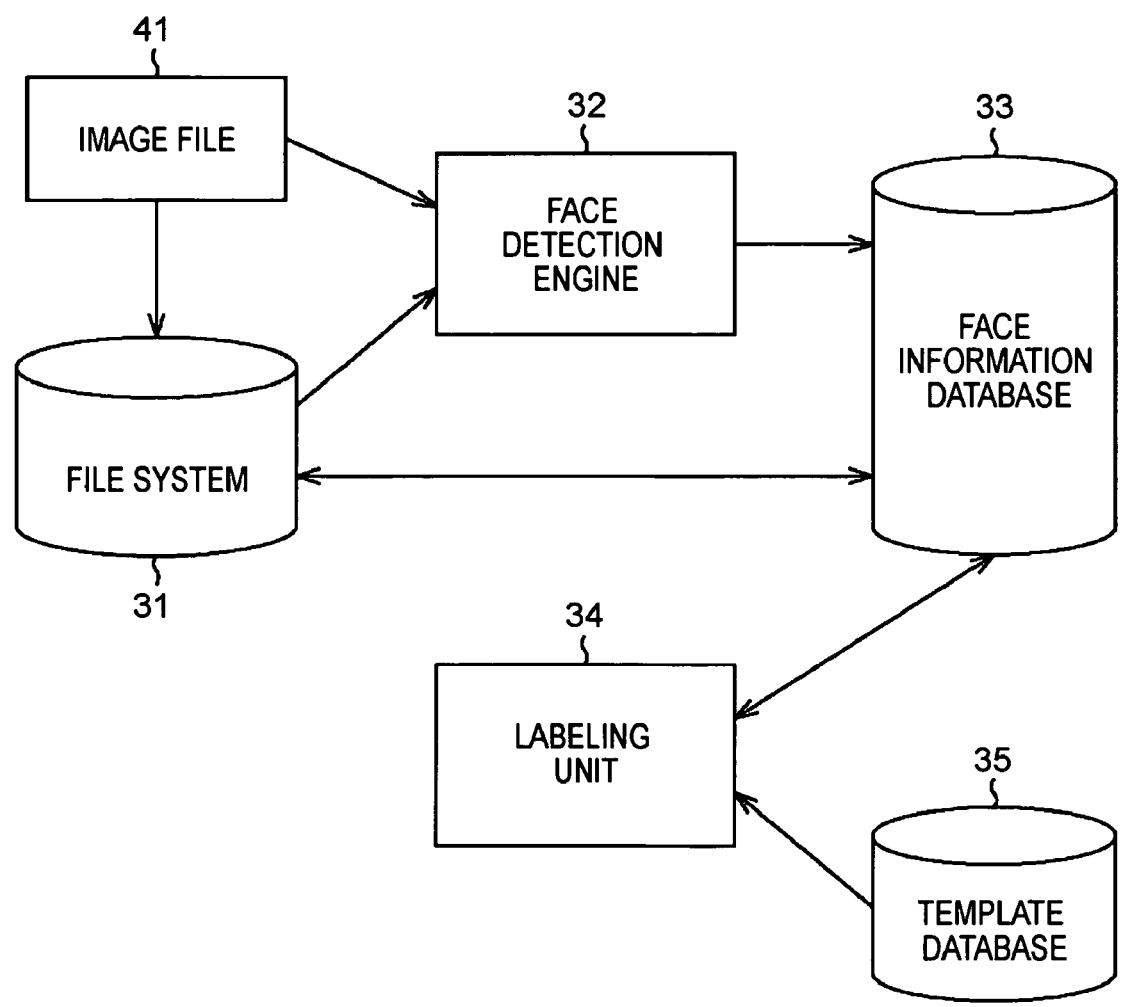
FIG. 2 is a block diagram showing the structure of a function to detect a face and to add a label.

FIG. 2 is a block diagram showing the structure of a function to detect a face and to add a label. This function is implemented in the image processing apparatus, which is a personal computer executing a program. The image processing apparatus shown in FIG. 2 includes a file system 31, a face detection engine 32, a face information database 33, a labeling unit 34, and a template database 35.

An image file 41 is stored in the file system 31. A static image (data) photographed by the input unit 16, which is a digital still camera, or a static image (data) photographed by an external apparatus is stored in the image file 41. The file system 31 supplies the image file 41 stored in the file system 31 to the face detection engine 32.

For example, the file system 31 manages storing of data as a file into the storage unit 18, which is a hard disk. The file system 31 causes the storage unit 18 to store data as a file and reads a file stored in the storage unit 18.

The image file 41 stores image data of a predetermined format, such as a bitmap format, a joint photographic experts group (JPEG) format, a JPEG 2000 format, a graphics interchange format (GIF), or a tagged image file format (TIFF).

The face detection engine 32 detects the number of face image elements, which are one or more image elements of faces, included in each image. For example, the face detection engine 32 detects the number of face image elements included in an image stored in the image file 41 supplied from an external apparatus or stored in the image file 41 supplied from the file system 31. The face detection engine 32 supplies face detection information including the detected number of face image elements to the face information database 33.

The face information database 33 associates each image with a detected number of face image elements. For example, the face information database 33 stores each image and face detection information indicating the detected number of face image elements in association with each other.

The face information database 33 causes face detection information to be stored in the storage unit 18.

The labeling unit 34 generates a label indicating the category of an image in accordance with the number of face image elements included in the image and a reference value stored in advance. For example, the labeling unit 34 generates a label indicating the category (property) of an image, such as "portrait", "two-shot photograph", "group photograph", or "landscape photograph" in accordance with face detection information stored in the face information database 33 and a template stored in the template database 35. A label indicates that the main subject of an image is a human being.

Templates serving as criteria of classification of images are stored in advance in the template database 35. In practice, the template database 35 causes the templates to be stored in the storage unit 18.

A label that is generated by the labeling unit 34 and that indicates the category of each image is stored in the face information database 33 such that the label is associated with the corresponding image.

Figure 3:
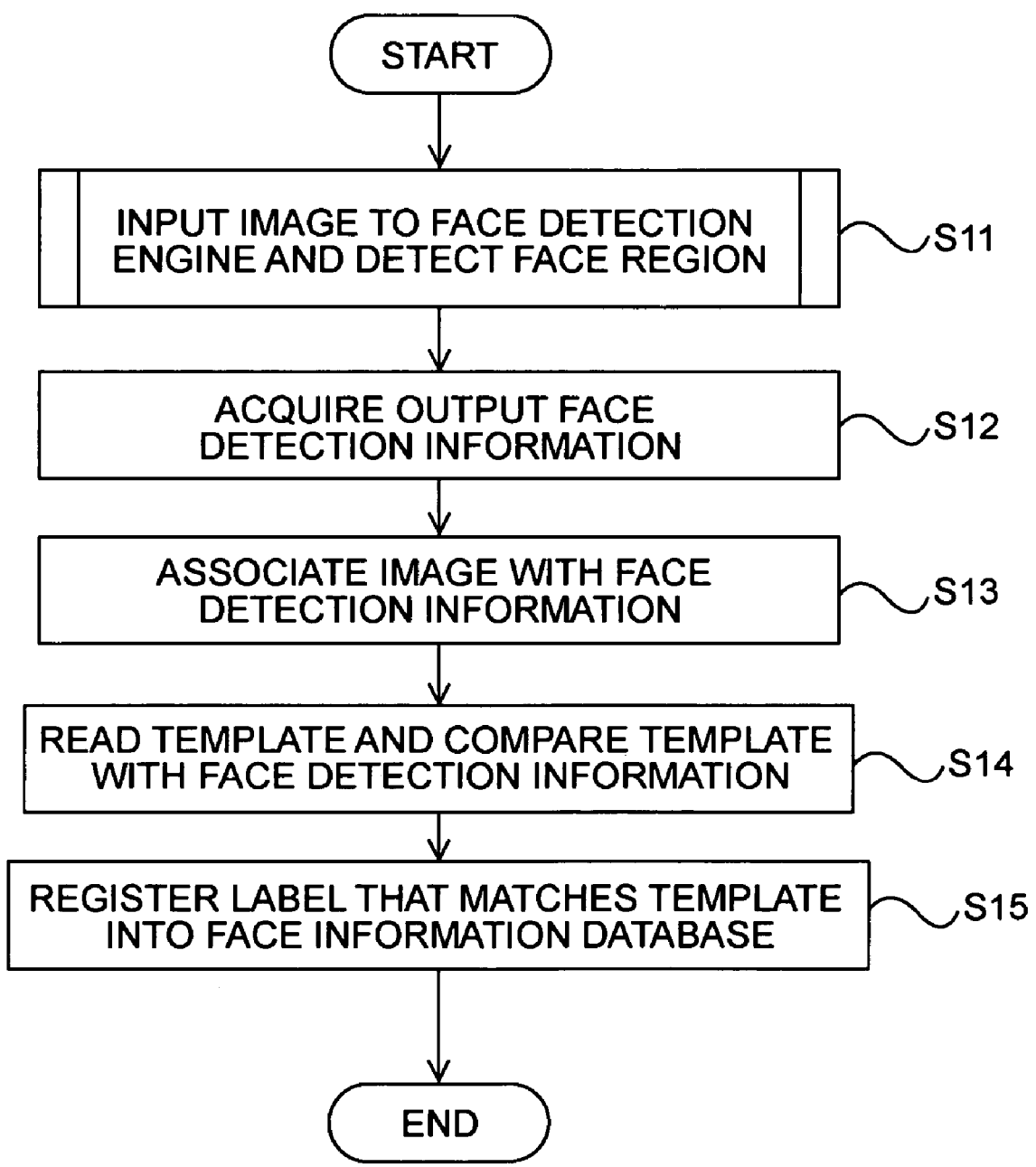
FIG. 3 is a flowchart of a labeling process.

FIG. 3 is a flowchart of a labeling process. In step S11, the face detection engine 32 opens the image file 41, inputs an image, and detects a face region (face image element) from the input image.

Figure 4:
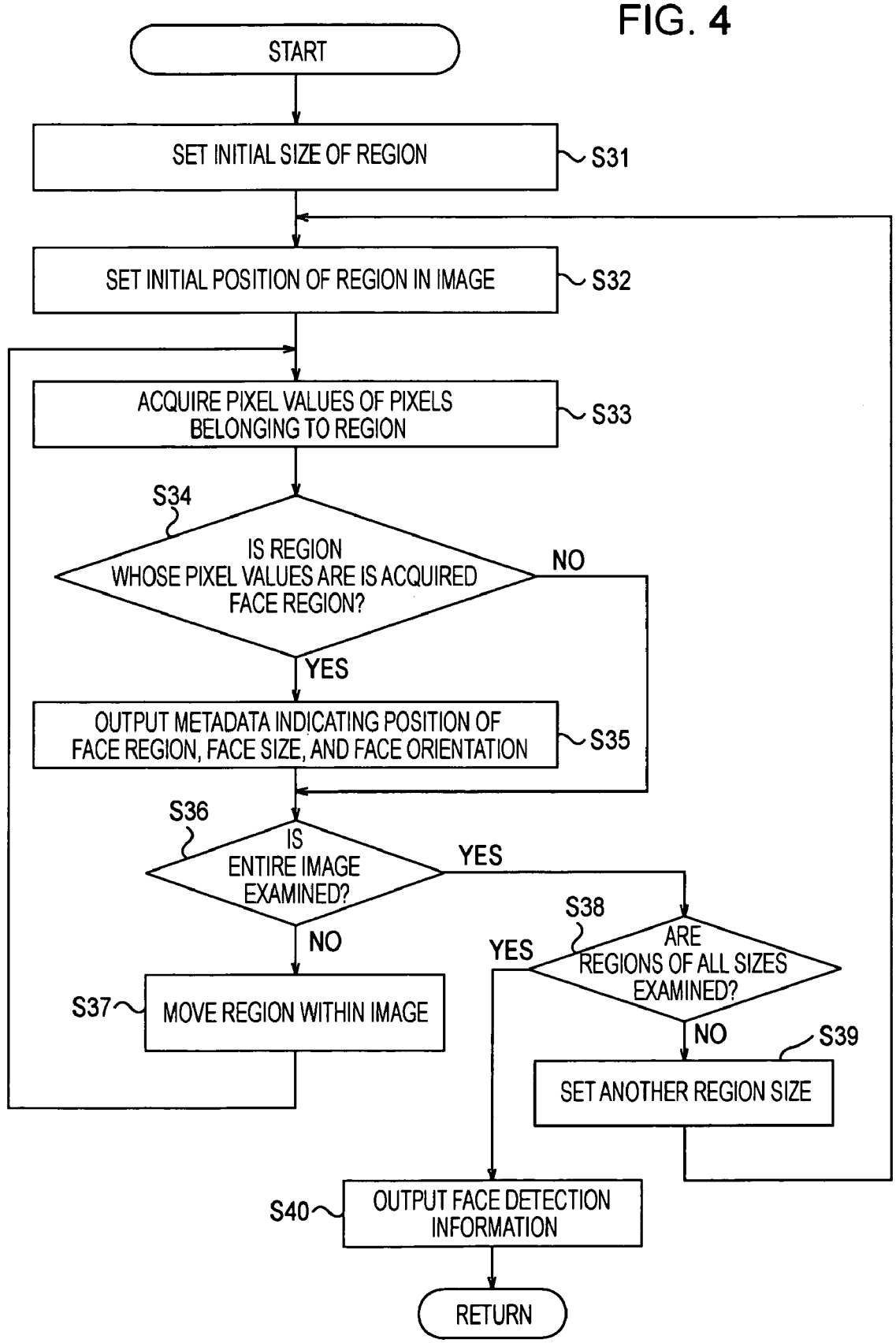
FIG. 4 is a flowchart of a process for detecting a face region.

A process for detecting a face region is described next with reference to a flowchart shown in FIG. 4.

In step S31, the face detection engine 32 sets the initial size of a region to be detected. In step S32, the face detection engine 32 sets the initial position of the region in the input image.

In step S33, the face detection engine 32 acquires pixel values of pixels belonging to the region. In step S34, the face detection engine 32 determines whether or not the region whose pixel values are acquired is a face region.

In other words, in step S34, the face detection engine 32 detects a face image element in the region whose pixel values are acquired.

Figure 5:
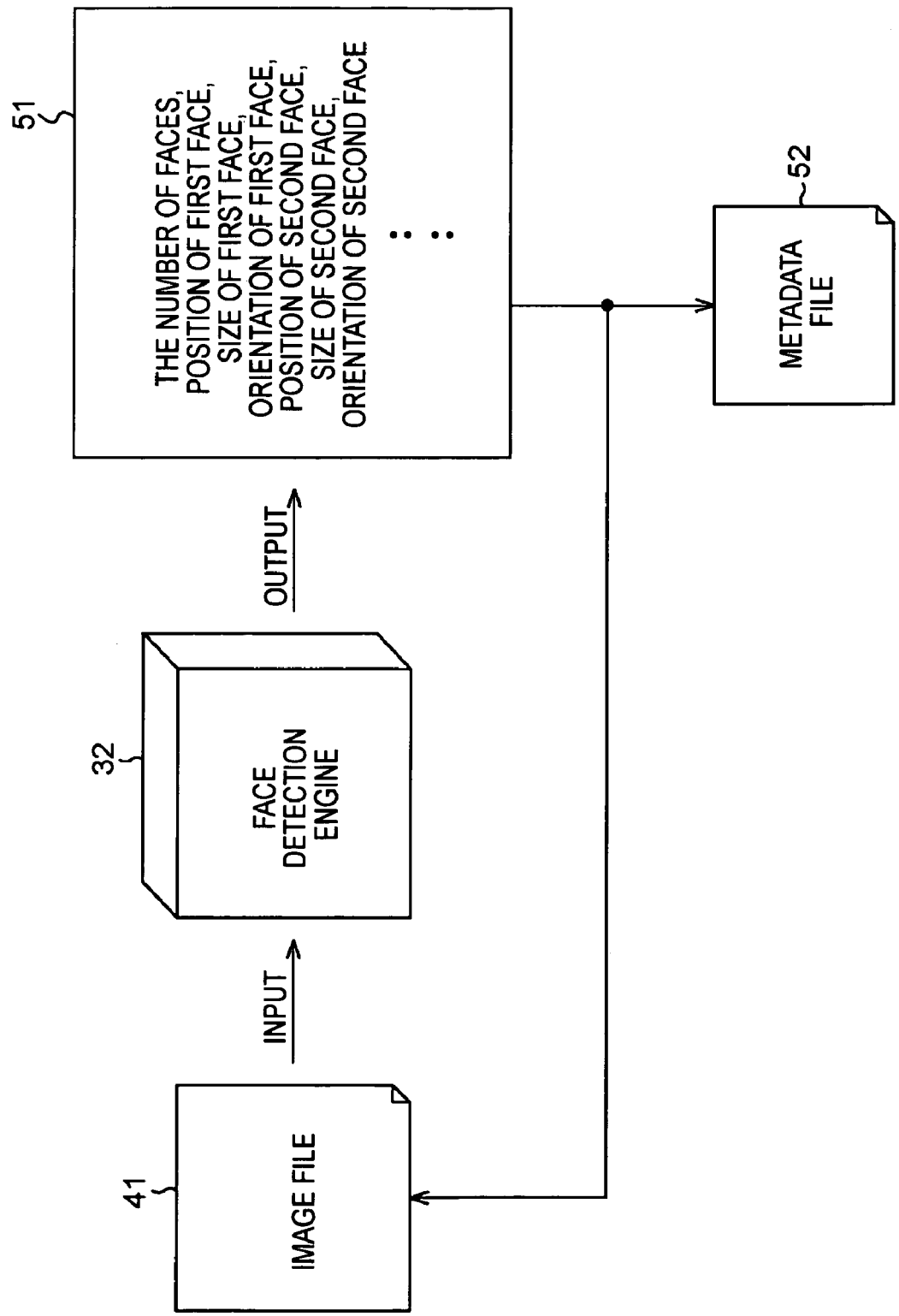
FIG. 5 is an illustration for explaining face detection.

For example, as shown in FIG. 5, in step S34, the face detection engine 32 that inputs the image file 41 storing JPEG image data determines whether or not the region whose pixel values are acquired is a face region in accordance with whether or not the acquired pixel values indicate a color within a predetermined color range corresponding to the color of human skin.

If it is determined in step S34 that the region whose pixel values are acquired is a face region, the process proceeds to step S35. In step S35, the face detection engine 32 outputs metadata indicating the position of the face region, which is the region whose pixel values are acquired, the face size, and the face orientation. Then, the process proceeds to step S36.

For example, in step S35, the face detection engine 32 detects the vertical and horizontal positional values at the center of the face region, which are represented by relative coordinates, as the position of the face in the image when each of the vertical size and the horizontal size of the entire image is set to 1, and outputs metadata indicating the detected position.

In addition, for example, in step S35, the face detection engine 32 detects the size of the face in the image, which includes the height and width of the face region, represented by relative coordinates when each of the vertical size and the horizontal size of the entire image is set to 1, and outputs metadata indicating the detected face size.

In addition, for example, in step S35, the face detection engine 32 determines whether or not a pattern, from among a plurality of patterns in assumed face orientations defined in advance, corresponds to the image element of the face region, and outputs metadata indicating a face orientation, which is the orientation corresponding to the pattern that corresponds to the image element of the face region. For example, the face orientation is indicated by an index of a pattern that corresponds to the image element of the face region.

For example, in step S35, the face detection engine 32 outputs metadata indicating the position of the face region, the face size, and the face orientation to a storage region on the RAM 13 that is managed by the face detection engine 32. In such a case, the metadata indicating the position of the face region, the face size, and the face orientation is stored.

If it is determined in step S34 that the region whose pixel values are acquired is not a face region, the process skips to step S36.

In step S36, the face detection engine 32 determines whether or not the entire image is examined on the basis of the set size. If it is determined in step S36 that the entire image is not examined, the process proceeds to step S37. In step S37, the face detection engine 32 moves the region within the image. Then, the process returns to step S33 to repeat the above-described processing.

For example, in step S37, the face detection engine 32 moves the region within the image in a raster scan order by the number of pixels set in advance. In this case, the face detection engine 32 may move the region by the number of pixels determined in accordance with the size of the region (for example, the number of pixels corresponding to ten percent of the height and width of the region).

Accordingly, a region is moved within the image in order, and it is determined whether or not the region is a face region. In other words, a region is moved within the image in order, and a face image element in the region is detected.

If it is determined in step S36 that the entire image is examined, the process proceeds to step S38. In step S38, the face detection engine 32 determines whether or not regions of all the sizes set in advance are examined.

If it is determined in step S38 that regions of all the sizes set in advance are not examined, the process proceeds to step S39. In step S39, the face detection engine 32 sets another region size. Then, the process returns to step S32 to repeat the above-described processing.

In this case, in steps S32 to S37, it is determined whether or not the region that is different from the region in the previous processing is a face region.

If it is determined in step S38 that regions of all the sizes set in advance are examined, the process proceeds to step S40. In step S40, the face detection engine 32 outputs face detection information 51 indicating the number of face image elements included in the entire image stored in the image file 41 and the property of each of the face image elements, such as the position, the size, and the orientation. Then, the process is terminated.

As described above, the position and the size of a region in the image are changed, and it is determined whether or not the region is a face region. Thus, the face detection engine 32 detects the number of face image elements in the entire image stored in the image file 41, and detects the position, size, and orientation of each of the face image elements.

Referring back to FIG. 3, in step S12, the face information database 33 acquires the face detection information 51 output from the face detection engine 32. In step S13, the face information database 33 stores the image and the face detection information 51 in association with each other.

In this case, for example, as shown in FIG. 5, the face information database 33 creates a metadata file 52 including the face detection information 51, and stores the metadata file 52 independent of the image file 41.

Figure 6:
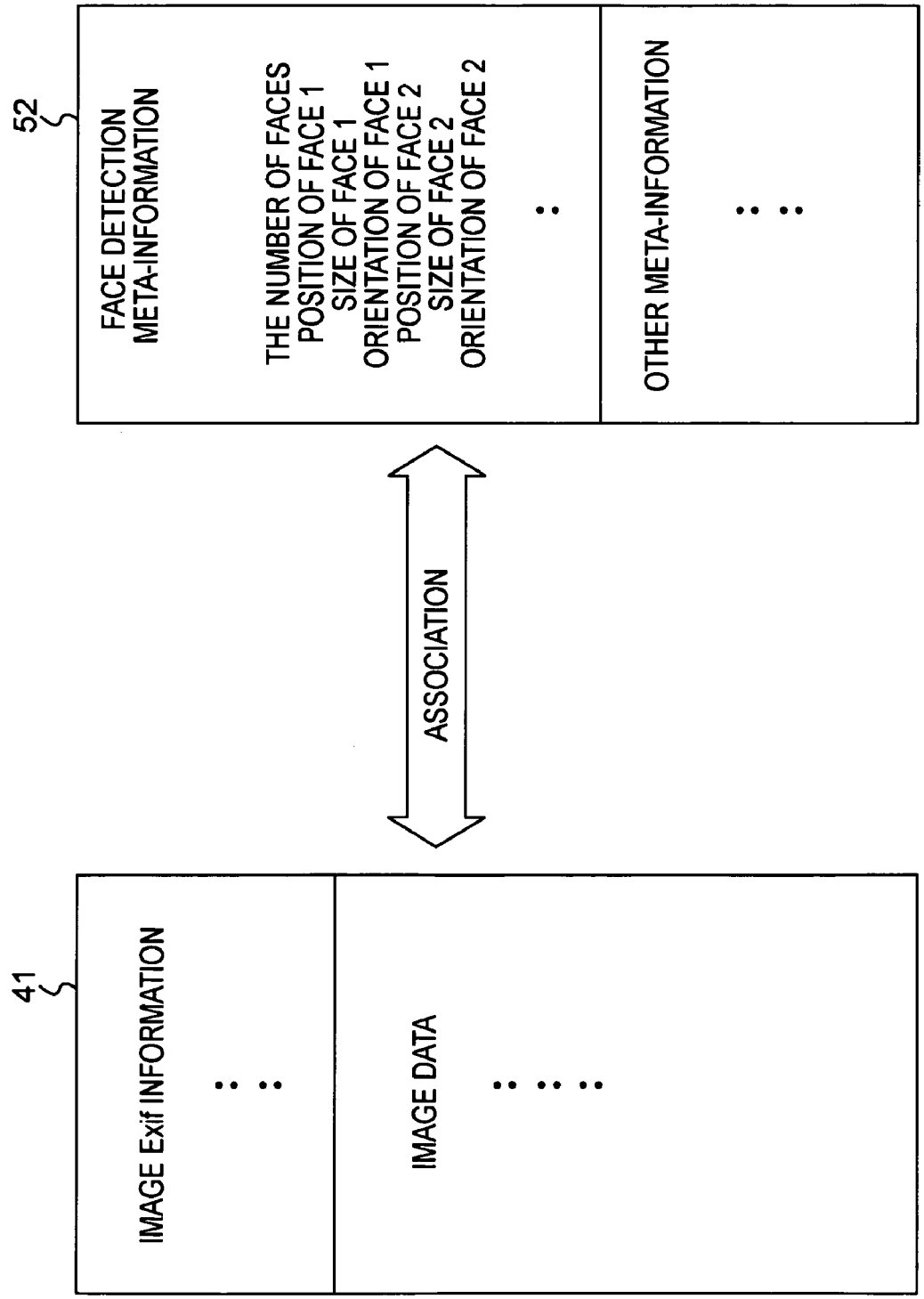
FIG. 6 is an illustration for explaining storage of face detection information.

As shown in FIG. 6, the metadata file 52 stores face detection meta-information (the face detection information 51) indicating the number of face image elements and the property of each of the face image elements, such as position, size, and orientation, and other meta-information. The metadata file 52 is associated with the image file 41 storing image Exif information and image data by the face information database 33. Alternatively, the metadata file 52 is associated with the image file 41 by providing the metadata file 52 with a file name associated with the image file 41 (for example, a portion before the period of the file name of the metadata file 52 is equal to a portion before the period of the file name of the image file 41, and the extension of the metadata file 52 is different from the extension of the image file 41).

Figure 7:
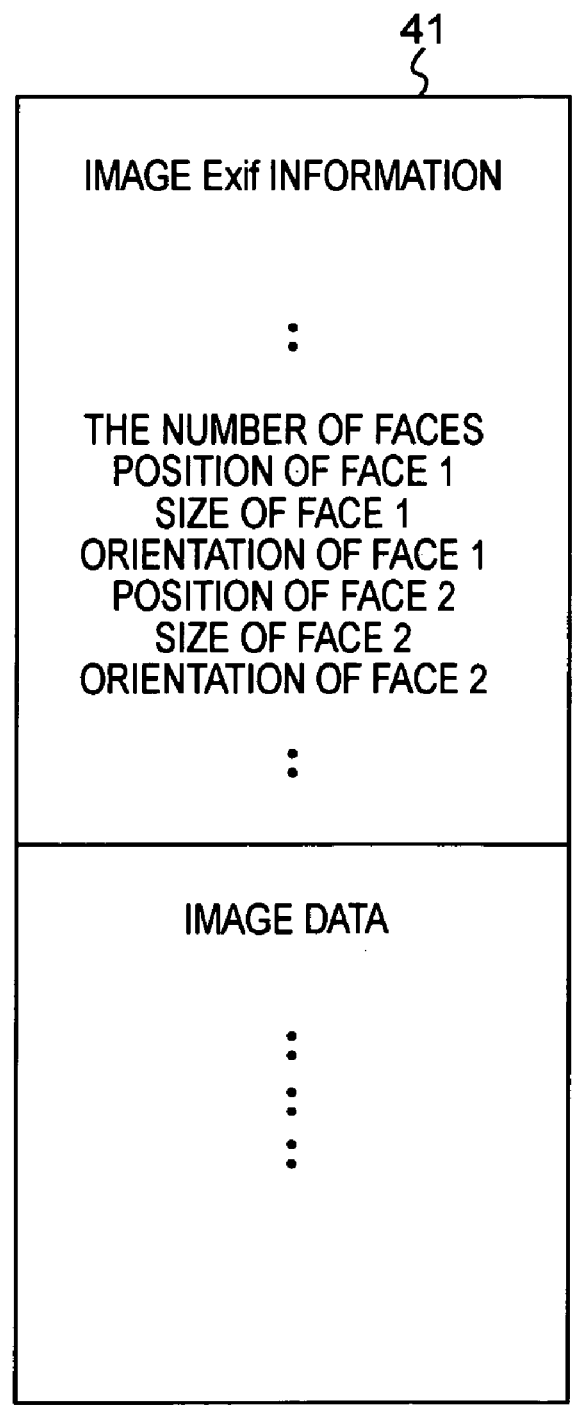
FIG. 7 is an illustration for explaining storage of face detection information.

As shown in FIGS. 5 and 7, face detection meta-information (the face detection information 51) indicating the number of face image elements and the property of each of the face image elements, such as position, size, and orientation, may be stored as image Exif information in the image file 41.

Referring back to FIG. 3, in step S14, the labeling unit 34 reads a template from the template database 35, and compares the read template with the face detection information 51.

FIG. 8 shows examples of templates stored in the template database 35.

A photograph whose main subject is a person is generally called a "portrait". Normally, in a portrait, a single face of a relatively large size with respect to the size of the entire screen is photographed. If the face is located at the center of the image, it is assumed that the subject of the image, such as a photograph of the upper half of the body, is obviously a person.

As shown in FIG. 8, a template having a template name "portrait" and indicating that the number of face image elements is 1, that the face is located at the center of the image, that the size of the face is large, and that the face is oriented toward the front is stored in the template database 35.

Here, if the face is located at a position shifted left or right from the center of the image, it is assumed that the image is a commemorative photograph in which an object located at the center of the image is also photographed.

If a small sized face located at a center upper portion of an image with respect to a vertically long picture frame is detected, it is assumed that the full-length figure of a person is photographed.

A photograph whose main subjects are two people is commonly called a "two-shot photograph".

As shown in FIG. 8, a template having a template name "two-shot photograph" and indicating that the number of face image elements is 2 or 3, that each of the faces is located in the vicinity of the center of the image, that the size of each of the faces is large or medium, and that each of the faces is oriented toward the front or the faces are oriented toward each other is stored in the template database 35.

If face regions of substantially the same size that are relatively close to each other are detected in an image, it is assumed that the image is a small-group photograph in which three or a small number of people are photographed. Although not shown in FIG. 8, a template having a template name "small-group photograph" and indicating that the number of face image elements is 3 to 7, that each of the faces is located close to each other, that the size of each of the faces is medium or small, and that each of the faces is oriented toward the front is stored in the template database 35.

A photograph whose main subject is a group of people is generally called a "group photograph". If a plurality of faces of substantially the same size is arranged in a lengthwise or crosswise direction with predetermined spaces therebetween over a wide range, it is assumed that the image is a group photograph taken during a group tour or the like.

A group photograph taken at an event evokes memories at the event. For example, giving a higher priority to group photographs in classification of images by specifying group photographs at an event on the basis of dispersion of photographing time is useful.

As shown in FIG. 8, a template having a template name "group photograph" and indicating that the number of face image elements is 8 to 13, that each of the faces is located in an upper half portion of the image and the faces spread in a crosswise direction, that the size of each of the faces is small, and that each of the faces is oriented toward the front is stored in the template database 35.

In addition, a photograph whose main subject is a landscape or an object other than human beings is generally called a "landscape photograph". If a face image element is not detected, if face image elements disperse, or if a face image element is located at an end of an image, it is assumed that the main subject of the image is not a human being.

As shown in FIG. 8, a template having a template name "landscape photograph" and indicating that the number of face image elements is 0 is stored in the template database 35. For the template whose name is "landscape photograph", the number of faces is not counted depending on the size and orientation of a face.

In addition, for the template whose name is "landscape photograph", the position of a face is not restricted. In addition, the number of small sized faces is not counted, and the number of sideways faces is not counted.

As described above, for example, in step S14, the labeling unit 34 reads a template shown in FIG. 8 from the template database 35, and compares the template with the face detection information 51.

In step S14, the labeling unit 34 may compare part of a template with part of the face detection information 51. Alternatively, in step S14, the labeling unit 34 may compare the entire template with the entire face detection information 51. For example, the labeling unit 34 may compare the number of faces indicated by a template with the number of faces in the face detection information 51. Alternatively, for example, the labeling unit 34 may compare the number of faces, the position of each of the faces, the size of each of the faces, and the orientation of each of the faces indicated by a template with the number of faces, the position of each of the faces, the size of each of the faces, and the orientation of each of the faces in the face detection information 51.

In addition, a template indicating the combination of theories of photographic technique may be prepared.

In step S15, the labeling unit 34 registers a label that matches a template into the face information database 33. Then, the process is terminated.

For example, if the number of faces included in the face detection information 51 is 1, since the number of faces indicated by a template corresponding to "portrait" is 1, an image associated with the face detection information 51 is registered (stored) into the face information database 33 such that the image is associated with a label indicating "portrait".

For example, if the face detection information 51 indicates that the number of faces is two, that each of the faces is located in the vicinity of the center of the image, that the size of each of the faces is medium, and that each of the faces is oriented toward the front, since a template corresponding to "two-shot photograph" indicates that the number of faces is 2 or 3, that each of the faces is located in the vicinity of the center of the image, that the size of each of the faces is large or medium, and that each of the faces is oriented toward the front or the faces are oriented toward each other, the image associated with the face detection information 51 is registered into the face information database 33 such that the image is associated with a label indicating "two-shot photograph".

As described above, a label indicating the category of each image, such as a label indicating "portrait", "two-shot photograph", "small-group photograph", "group photograph", or "landscape photograph", is associated with each image, and registered into the face information database 33.

A label is stored in the metadata file 52 or stored as image Exif information in the image file 41.

A template may be set as a so-called default. Alternatively, a user may change a template. In this case, by causing processing in steps S14 and S15 to be performed when the template is changed, a label associated with each of images can be changed in accordance with the changed template. That is, a label associated with an image is dynamically changed.

FIG. 9 is a block diagram showing the structure of an image search function that is implemented by an image processing apparatus, which is a personal computer executing a program. An image processing apparatus shown in FIG. 9 includes the file system 31, the face detection engine 32, the face information database 33, the template database 35, a search condition acquisition unit 81, a search engine 82, and a display controller 83.

Obviously, the image processing apparatus may include the labeling unit 34 and may have a structure in which the structure shown in FIG. 2 is combined with the structure shown in FIG. 9.

The metadata file 52 indicating the number of face image elements included in the entire image and the property of each of the face image elements, such as position, size, and orientation and a label indicating the category of the image that are associated with the image are stored in the face information database 33.

The search condition acquisition unit 81 acquires, in accordance with a signal received from the input unit 16 including a keyboard, a mouse, and the like operated by a user, a search condition for searching for an image.

The search condition acquisition unit 81 includes a margin adder 91. The margin adder 91 adds a margin to an acquired search condition. That is, the margin adder 91 adds a margin to an acquired search condition serving as a reference value, and generates a search condition having a predetermined range (width). Adding such a margin allows a search condition to have a predetermined range.

The search condition acquisition unit 81 supplies the acquired search condition to the search engine 82.

The search engine 82 searches for the image file 41 stored in the file system 31 on the basis of the search condition supplied from the search condition acquisition unit 81. The search engine 82 supplies the found image file 41 to the display controller 83.

The display controller 83 causes an image to be displayed on the output unit 17, which is a display, in accordance with image data stored in the image file 41 supplied from the search engine 82.

Figure 10:
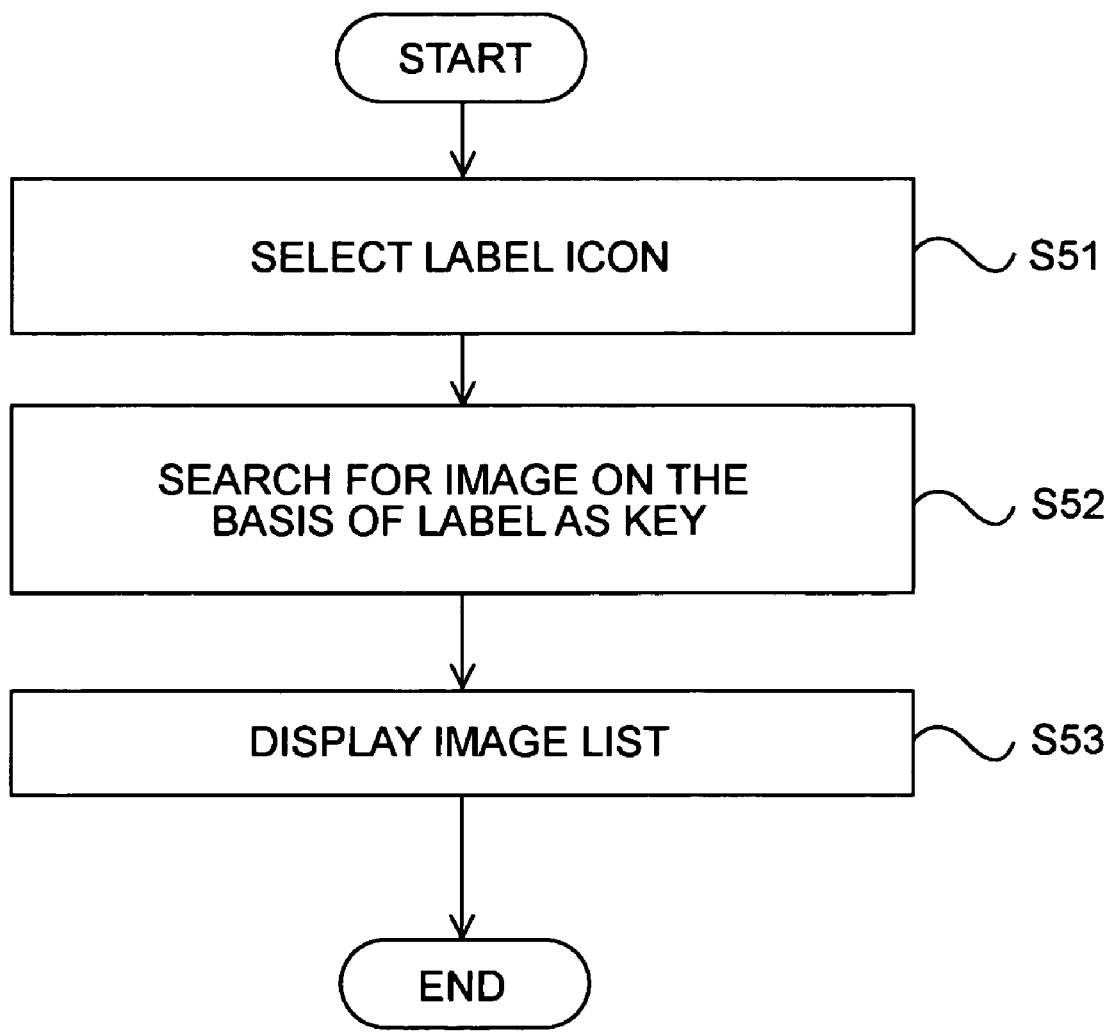
FIG. 10 is a flowchart of an example of a search process.

FIG. 10 is a flowchart of an example of a search process. In step S51, the search condition acquisition unit 81 selects a label icon displayed on the output unit 17 in accordance with a signal received from the input unit 16 including a keyboard, a mouse, and the like operated by a user.

Figure 11:
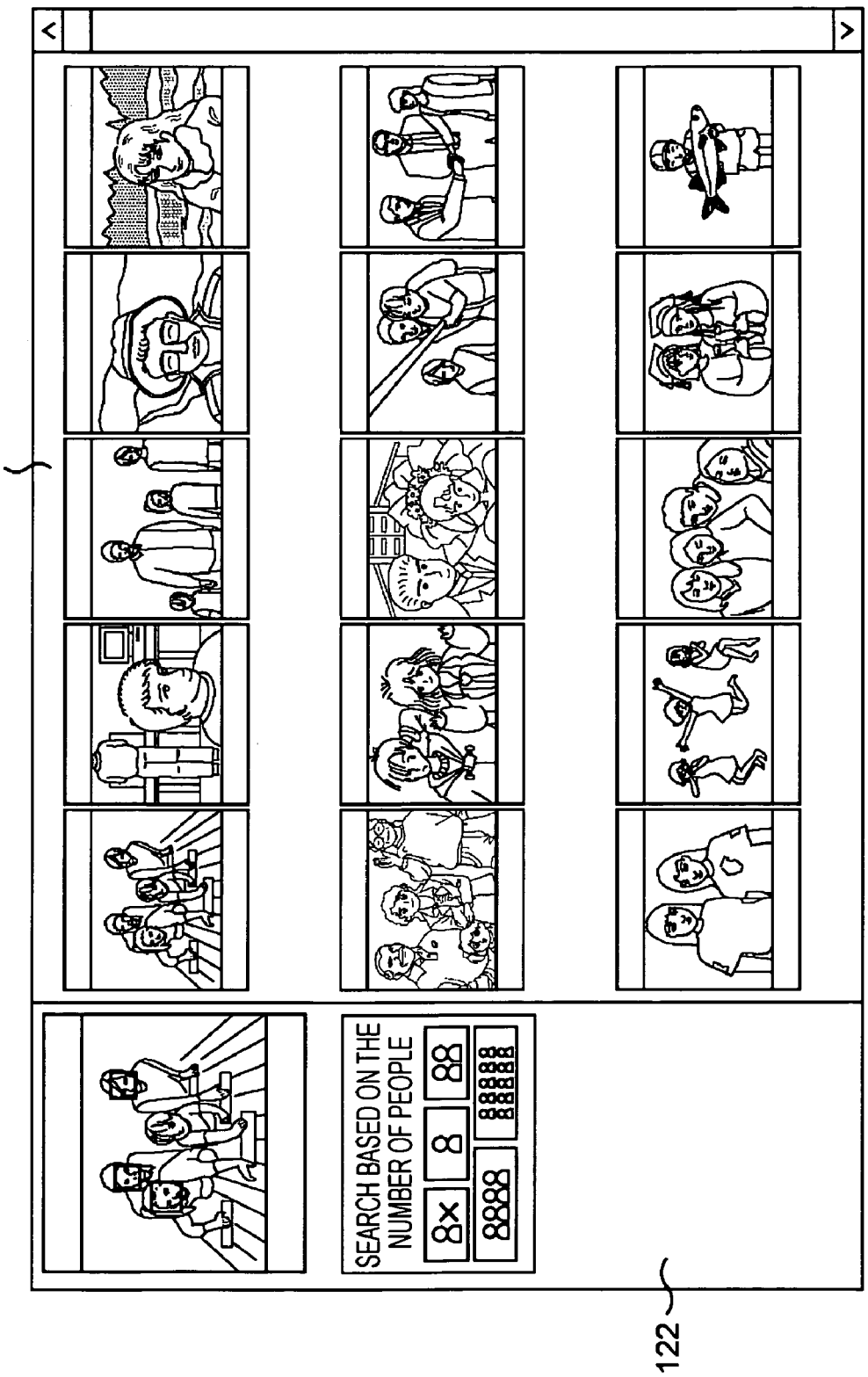
FIG. 11 shows an example of display of images for search.

FIG. 11 shows an example of display of graphical user interface (GUI) images for searching. The GUI images are displayed on the output unit 17. A thumbnail image display area 121 is provided in a right portion of the screen of the output unit 17. Thumbnail images corresponding to image data stored in image files 41 to be searched for or thumbnail images corresponding to image data stored in found image files 41 are displayed in the thumbnail image display area 121. In the thumbnail image display area 121 shown in FIG. 11, thumbnail images are arranged in five lines. When a user operates a scroll bar disposed at the right of the thumbnail image display area 121, thumbnail images are scrolled vertically.

A search tool display area 122 is provided in a left portion of the screen of the output unit 17. The search tool display area 122 includes tools used for image search. A selected image is displayed in an upper portion of the search tool display area 122 shown in FIG. 11 so as to be relatively larger than each of the thumbnail images. In the image displayed in the upper portion of the search tool display area 122, squares indicating regions of detected faces are indicated.

Label icons are disposed in a lower portion of the search tool display area 122 shown in FIG. 11. Each of the label icons is an icon used by a user to select a label as a search condition.

Figure 12:
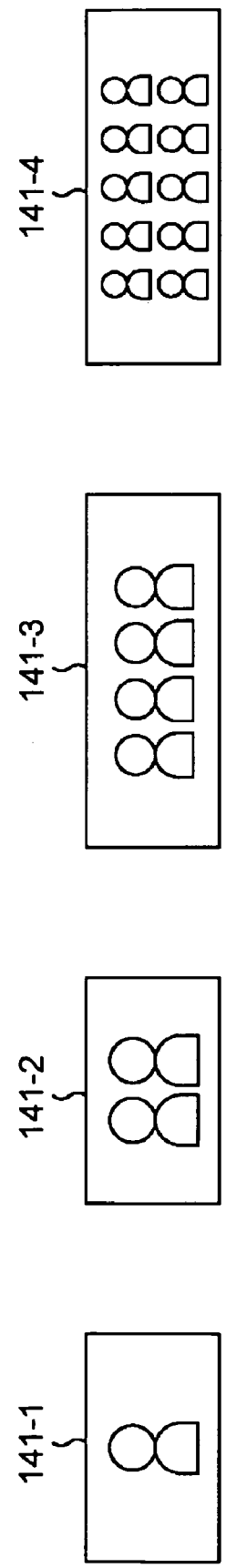
FIG. 12 shows examples of label icons.

FIG. 12 shows examples of label icons. A label icon 141-1 is an icon used by the user to select, as a search condition, a label corresponding to "portrait". A label icon 141-2 is an icon used by the user to select, as a search condition, a label corresponding to "two-shot photograph". A label icon 141-3 is an icon used by the user to select, as a search condition, a label corresponding to "small-group photograph". A label icon 141-4 is an icon used by the user to select, as a search condition, a label corresponding to "group photograph".

Hereinafter, when it is unnecessary to distinguish between the label icons 141-1 to 141-4, each of the label icons is referred to as a label icon 141.

In step S51, when any label icon 141 is selected in accordance with an operation input to the input unit 16 including a keyboard, a mouse, and the like by a user, a search condition indicating a label corresponding to the selected label icon 141 is supplied to the search engine 82. For example, when the user selects the label icon 141-1, the search condition acquisition unit 81 supplies a search condition indicating a label corresponding to "portrait" to the search engine 82. For example, when the user selects the label icon 141-3, the search condition acquisition unit 81 supplies a search condition indicating a label corresponding to "small-group photograph" to the search engine 82.

In step S52, the search engine 82 searches for an image on the basis of the label, which is the search condition, associated with an image. The label is used as a key in searching.

In other words, for example, the search engine 82 searches for a label corresponding to the label serving as a key from among labels stored in the face information database 33. The search engine 82 searches the file system 31 for an image file 41 associated with the found label, which corresponds to the label serving as a key. The search engine 82 reads the found image file 41 from the file system 31, and supplies the read image file 41 to the display controller 83.

In step S52, the search engine 82 may search for, from among images in a predetermined range, for example, images stored in a folder or directory set in advance or stored in a folder or directory selected by the user, a desired image, on the basis of the label, which is a search condition and serves as a key, associated with an image.

In step S53, the display controller 83 causes an image list to be displayed on the output unit 17, in accordance with image data stored in the image files 41 supplied from the search engine 82. Then, the process is terminated.

In this case, the display controller 83 may categorize images in accordance with the date or the like described in image Exif information, and a list of the categorized images may be displayed on the output unit 17.

Figure 13:
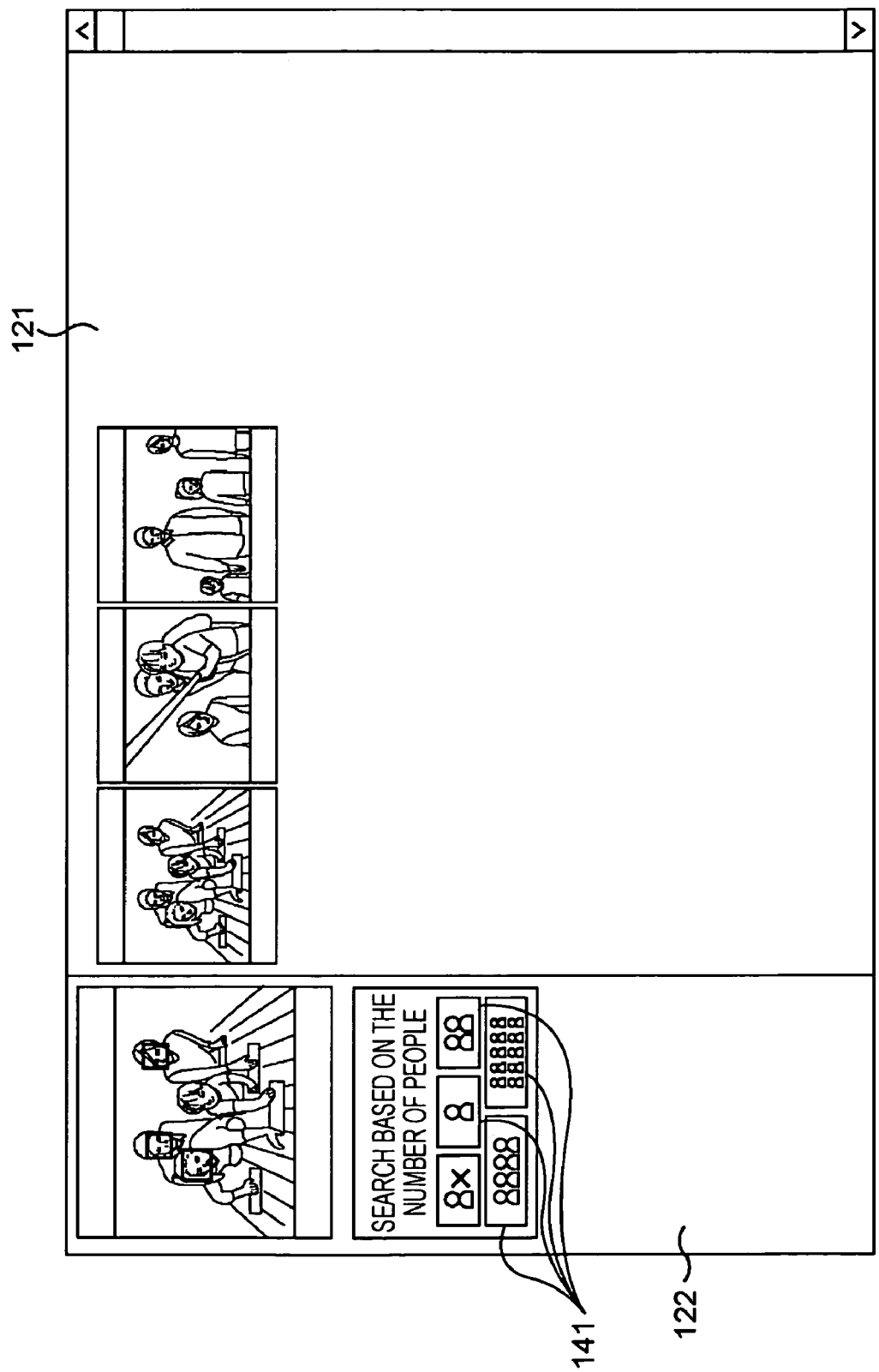
FIG. 13 shows an example of display of a list of found images.

FIG. 13 shows an example of a list of found images displayed in the thumbnail image display area 121. If the user selects the label icon 141-3 in step S51, a search condition indicating a label corresponding to "small-group photograph" is supplied to the search engine 82. Then, in step S52, an image file 41 associated with the label corresponding to "small-group photograph" is searched for from the file system 31.

Thus, in step S53, a list of images is displayed on the output unit 17. As shown in FIG. 13, images associated with the label corresponding to "small-group photograph", that is, for example, images in which the number of faces is 3 to 7, the faces are located close to each other, the size of each of the faces is medium or small, and each of the faces is oriented toward the front are searched for, and thumbnail images of the found images are displayed in the thumbnail image display area 121. In the example shown in FIG. 13, three image files 41 that are associated with the label corresponding to "small-group photograph" are found. Thus, three thumbnail images corresponding to the three image files 41 are displayed in the thumbnail image display area 121.

As described above, a desired image can be easily searched for with less time and effort.

Figure 14:
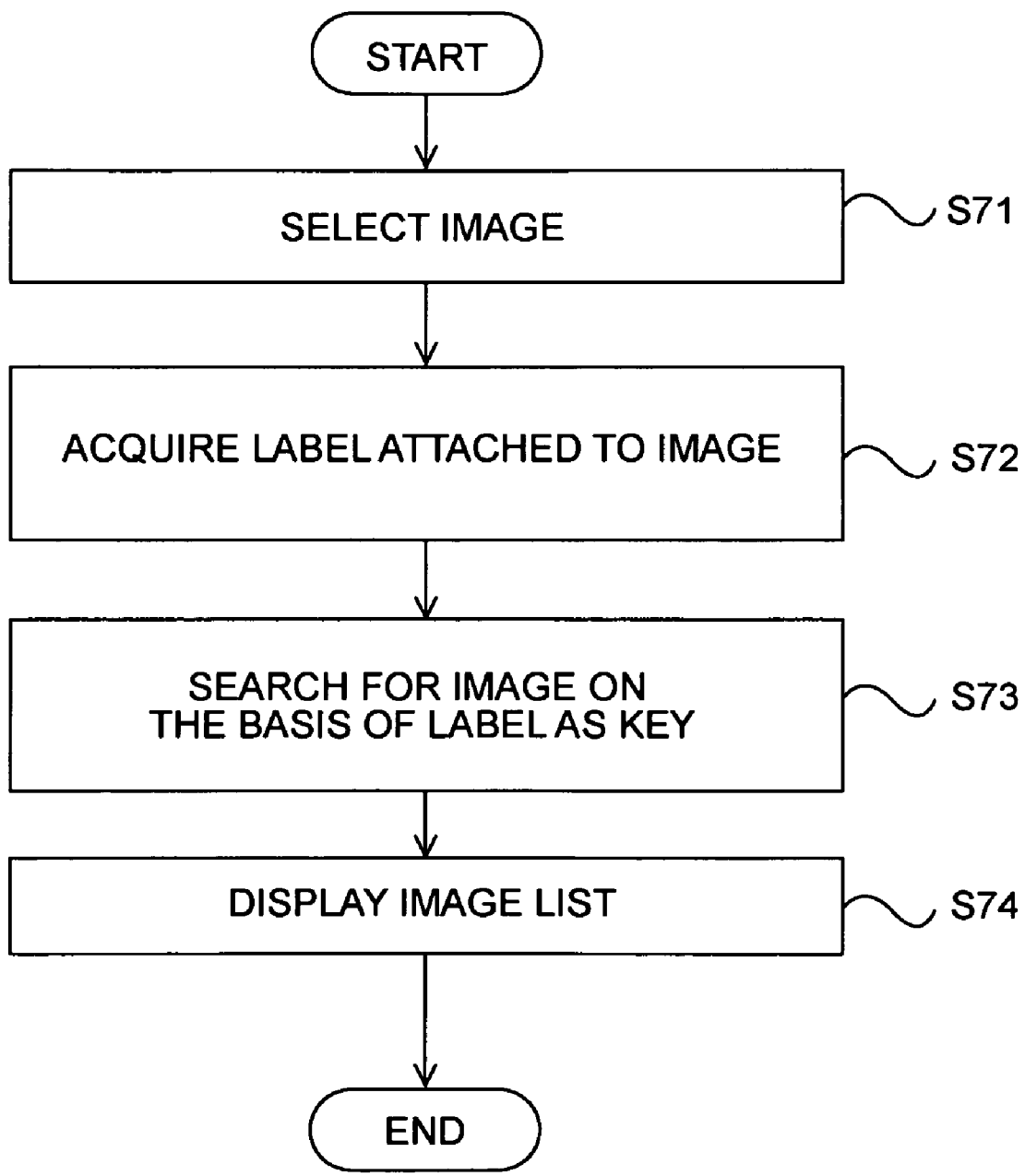
FIG. 14 is a flowchart of another example of the search process.

FIG. 14 is a flowchart of another example of the search process. In step S71, the search condition acquisition unit 81 selects an image in accordance with a signal received from the input unit 16 including a keyboard, a mouse, and the like operated by a user. For example, in step S71, the search condition acquisition unit 81 selects an image corresponding to a double-clicked thumbnail image from among thumbnail images displayed in the thumbnail image display area 121 in accordance with a signal received from the input unit 16.

In step S72, the search condition acquisition unit 81 acquires a label attached to the selected image from the face information database 33. That is, in step S72, the search condition acquisition unit 81 acquires a label associated with the selected image from among labels stored in the face information database 33.

Processing in steps S73 and S74 are similar to the processing in steps S52 and S53 in FIG. 10. Thus, the description of the processing in steps S73 and S74 will be omitted.

As described above, by only selecting an image, an image that is associated with a label similar to the label of the selected image can be searched for easily.

Figure 15:
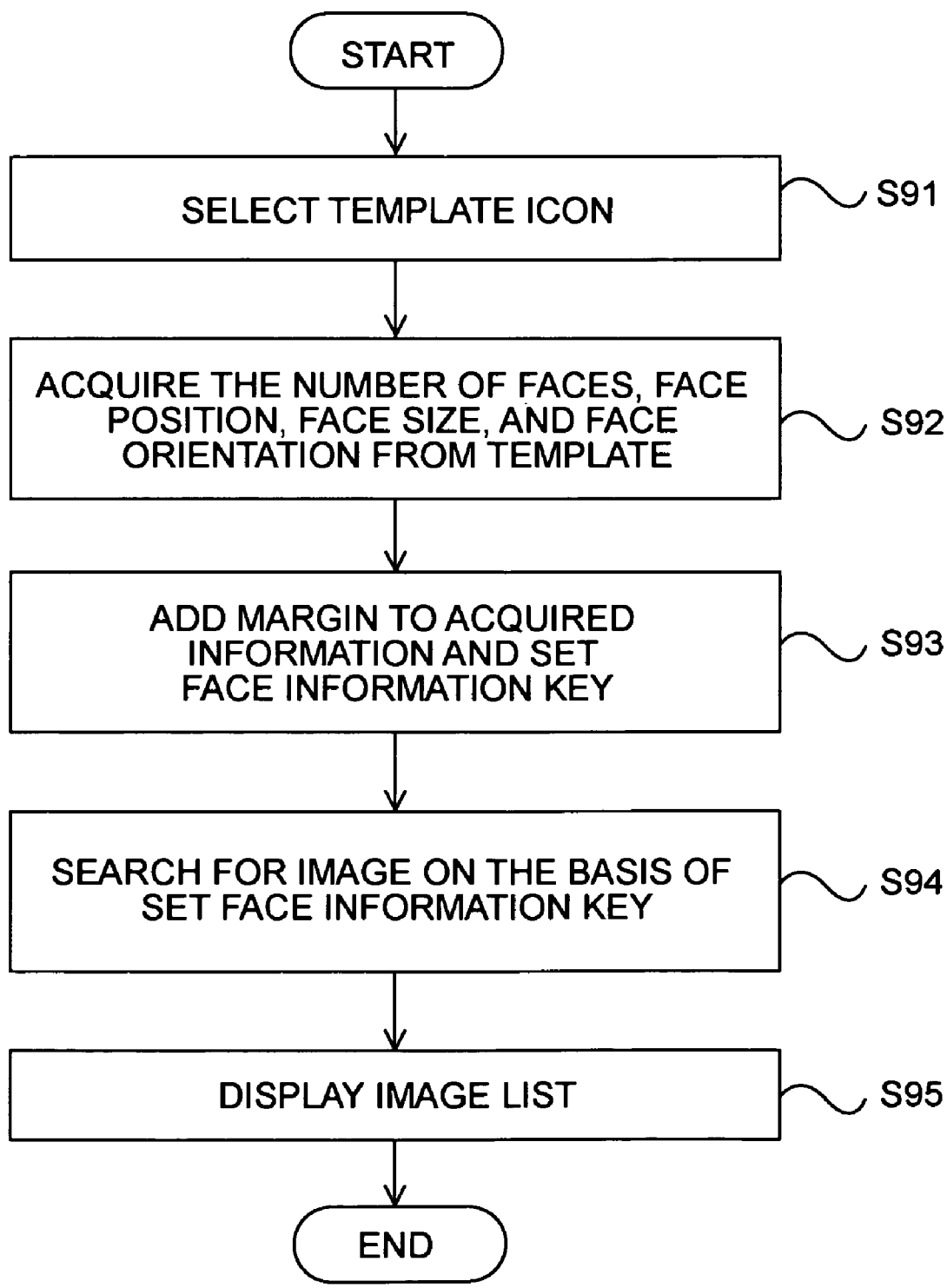
FIG. 15 is a flowchart of another example of the search process.

FIG. 15 is a flowchart of another example of the search process. In step S91, the search condition acquisition unit 81 selects a template icon displayed on the output unit 17, which is a display, in accordance with a signal received from the input unit 16 including a keyboard, a mouse, and the like operated by the user. A template icon is an icon used by the user to select a template serving as a search condition.

In step S92, the search condition acquisition unit 81 acquires from the template database 35 information, such as the number of faces, the position of each of the faces, the size of each of the faces, and the orientation of each of the faces, described as conditions in a template corresponding to the selected template icon. For example, when the templates shown in FIG. 8 are stored in the template database 35, in step S91, a template icon for selecting a template whose template name is "portrait" is selected. In this case, in step S92, the search condition acquisition unit 81 acquires information, which corresponds to the template whose template name is "portrait", indicating that the number of faces (face image elements) is 1, that the face is located at the center of the image, that the size of the face is large, and that the face is oriented toward the front.

In addition, for example, when the templates shown in FIG. 8 are stored in the template database 35, in step S91, a template icon for selecting a template whose template name is "group photograph" is selected. In this case, in step S92, the search condition acquisition unit 81 acquires information, which corresponds to the template whose template name is "group photograph", indicating that the number of faces (face image elements) is 8 to 13, that each of the faces is located in the upper half portion of the image, that the faces spread in a crosswise direction, that the size of each of the faces is small, and that each of the faces is oriented toward the front.

In step S93, the margin adder 91 adds a margin to the acquired information, and sets a face information key indicating a search range. For example, if, in step S92, information, which corresponds to a template whose template name is "two-shot photograph", indicating that the number of faces (face image elements) is 2 or 3, that each of the faces is located in the vicinity of the center of the image, that the size of each of the faces is large or medium, and that each of the faces is oriented toward the front or the faces are oriented toward each other is acquired, the margin adder 91 adds a margin "+1" to the number of faces. Thus, the margin adder 91 sets a face information key indicating that the number of faces (face image elements) is 2 to 4, that each of the faces is located in the vicinity of the center of the image, that the size of each of the faces is large or medium, and that each of the faces is oriented toward the front or the faces are oriented toward each other.

For example, the margin adder 91 may add a margin "−1" to the number of faces. Thus, the margin adder 91 may set a face information key indicating that the number of faces (face image elements) is 1 to 3, that each of the faces is located in the vicinity of the center of the image, that the size of each of the faces is large or medium, and that each of the faces is oriented toward the front or the faces are oriented toward each other.

A margin is not necessarily added to the number of faces (face image elements). A margin may be added to the position, size, or orientation of a face. Alternatively, margins may be added to the number of faces (face image elements), the position of each of the faces, the size of each of the faces, and the orientation of each of the faces.

In step S94, the search engine 82 searches for an image on the basis of the set face information key. For example, the search engine 82 searches for the metadata file 52 that stores face detection meta-information corresponding to the face information key from the face information database 33. Then, the search engine 82 searches for the image file 41 associated with the found metadata file 52 from the file system 31. The search engine 82 reads the found image file 41 from the file system 31, and supplies the read image file 41 to the display controller 83.

For example, when the search engine 82 searches for an image on the basis of a face information key indicating that the number of faces (face image elements) is 2 to 4, that each of the faces is located in the vicinity of the center of the image, that the size of each of the faces is large or medium, and that each of the faces is oriented toward the front or the faces are oriented toward each other, an image in which the number of faces (face image elements) is 2 to 4, that each of the faces is located in the vicinity of the center of the image, that the size of each of the faces is large or medium, and that each of the faces is oriented toward the front or the faces are oriented toward each other is searched for from the file system 31, and the found image is supplied to the display controller 83.

In step S95, the display controller 83 causes an image list to be displayed on the output unit 17, in accordance with image data stored in the image files 41 supplied from the search engine 82. Then, the process is terminated.

As described above, even if a label is not associated with an image, a desired image can be easily searched for on the basis of a template with less time and effort.

Figure 16:
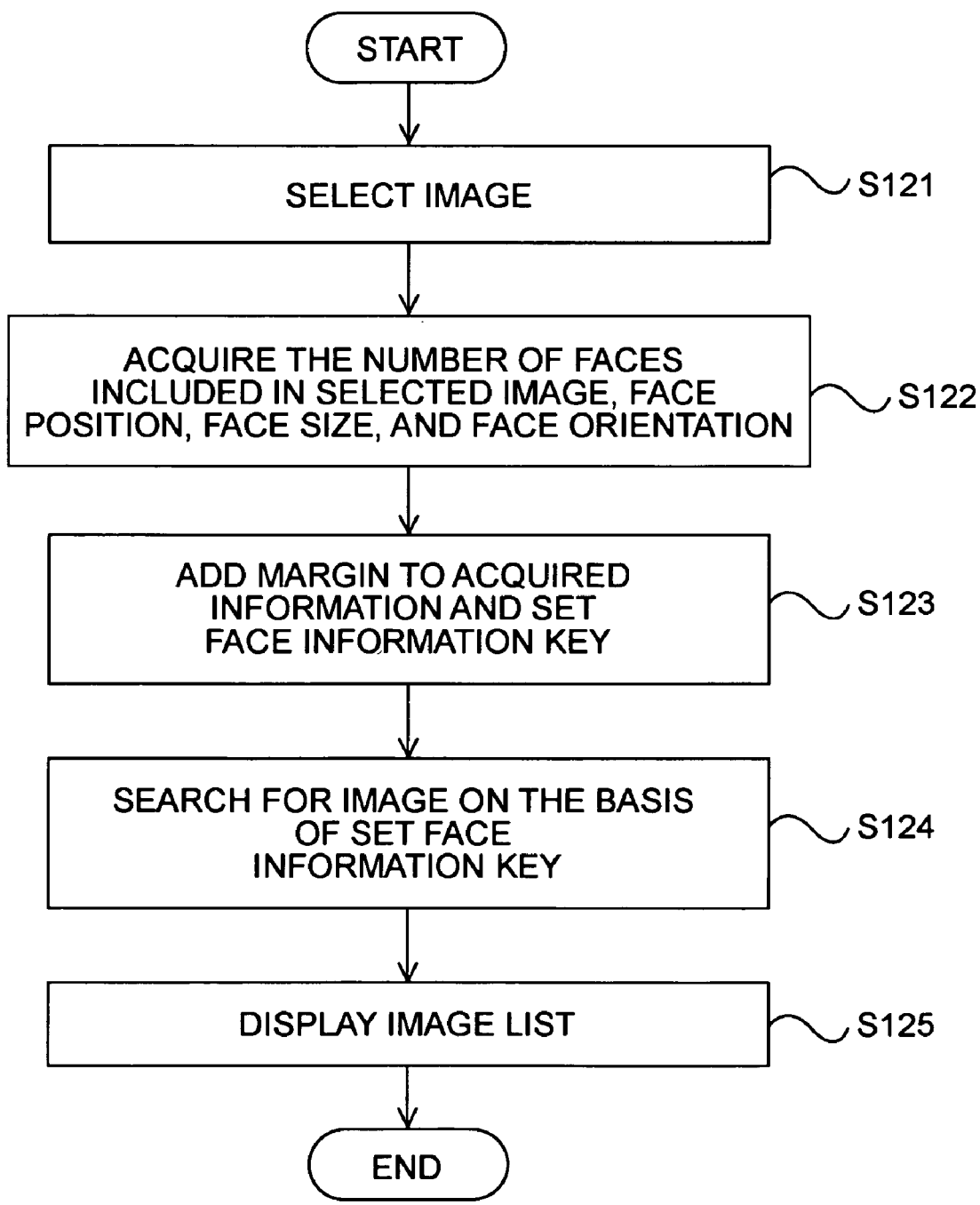
FIG. 16 is a flowchart of another example of the search process.

FIG. 16 is a flowchart of another example of the search process. In step S121, the search condition acquisition unit 81 selects an image in accordance with a signal received from the input unit 16 including a keyboard, a mouse, and the like operated by the user. For example, in step S121, the search condition acquisition unit 81 selects, in accordance with a signal received from the input unit 16, an image corresponding to a double-clicked thumbnail image from among thumbnail images displayed in the thumbnail image display area 121.

In step S122, the search condition acquisition unit 81 acquires the number of faces included in the selected image, the position of each of the faces, the size of each of the faces, and the orientation of each of the faces. For example, in step S122, the search condition acquisition unit 81 reads from the face information database 33 the metadata file 52 associated with the selected image. Then, the search condition acquisition unit 81 acquires the number of faces, the position of each of the faces, the size of each of the faces, and the orientation of each of the faces that are indicated by face detection information included in the read metadata file 52.

The face detection engine 32 may acquire the number of faces, the position of each of the faces, the size of each of the faces, and the orientation of each of the faces by detecting the number of faces included in the selected image, the position of each of the faces, the size of each of the faces, and the orientation of each of the faces.

Processing in steps S123 to S125 are similar to the processing in steps S93 to S95 in FIG. 15. Thus, the descriptions of the processing in steps S123 to S125 will be omitted.

As described above, even if a label is not associated with an image, a desired image can be easily searched for on the basis of a displayed image with less time and effort.

As described above, only by selecting an icon, only a necessary image can be filtered by internal processing of the image processing apparatus. Thus, an image that the user wants to view can be searched for. In addition, only by selecting an image that the user is currently viewing, an image can be searched for on the basis of the property of the selected image as a key. The found image is further filtered and displayed on the screen.

Using meta-information acquired by detecting a face image element, the main subject and the purpose of an image are presumed, and labeling is performed for the image in accordance with the presumed main subject and purpose. An image can be searched for easily on the basis of labeling.

In addition, in accordance with labeling, a higher-performance application can be proposed. For example, by combining labeling and a chronological order of photographing or meta-information, such as positional information by a global positioning system (GPS), images (photographs) accumulated over a long period of time can be automatically sorted by person or particular images (photographs), such as two-shot images, can be shared with others. In addition, a higher-performance application, such as a digest slide show providing important spot films (commemorative photographs) during travel or the like, in which photographs and image content owned by a user can be effectively utilized can be provided.

As described above, when information detected from an image is associated with the image, the image can be associated with the information. In addition, when the number of face image elements, which are one or more image elements of faces, included in an image is detected and the image is associated with the detected number of face image elements, a desired image can be easily searched for with less time and effort.

The foregoing series of processing may be performed by hardware or software. If the foregoing series of processing is performed by software, a program constituting the software is installed from a program storage medium on a computer installed in dedicated hardware or, for example, a general-purpose personal computer capable of performing various functions by installing various programs.

The program storage medium that is installed on the computer and that stores the program executable by the computer includes, for example, the removable medium 21, which is a package medium, such as a magnetic disc (e.g., a flexible disc), an optical disc (e.g., compact disc read-only memory (CD-ROM) or a digital versatile disc (DVD)), a magnetic optical disc (e.g., a Mini-Disc (MD)), or a semiconductor memory, the ROM 12 in which a program is temporarily or permanently stored, and a hard disk forming the storage unit 18, as shown in FIG. 1. A program is stored into the program storage medium using a wired or wireless communication medium, such as a local area network, the Internet, or digital satellite broadcasting, via the communication unit 19, which is an interface, such as a router or a modem, when necessary.

In this specification, steps defining a program stored in the program storage medium are not necessarily performed in chronological order in accordance with the written order. The steps may be performed in parallel or independently without being performed in chronological order.

In addition, in this specification, the term "system" represents the entire equipment constituted by a plurality of apparatuses.

In addition, embodiments of the present invention are not limited to the foregoing embodiments. Various changes can be made to the present invention without departing from the gist of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a detecting section detecting, in a first image, a quantity of faces, a size of the faces, and a facing direction of the faces, the quantity being one or more than one, the detecting section generating first metadata corresponding to the detection results;
   an associating section associating the first image with the first metadata;
   a generating section generating a label indicating a category of the first image based on the first metadata of the first image and a pre-determined reference value, the reference value comprising a value range including a maximum value and a minimum value; and
   a searching section searching for a second image based on the reference value specified by an icon selected by a user, the searching section comprising a margin adder, wherein the margin adder performs one of (1) increasing the maximum value while maintaining the minimum value or (2) maintaining the maximum value while decreasing the minimum value.

2. The image processing apparatus according to claim 1, wherein:
   the detecting section further detects the position of the faces in the first image; and
   the first metadata includes the detected position of the faces in the image.

3. The image processing apparatus according to claim 1, wherein the search section searches a third image, based on a number of faces in a user-selected image.

4. The image processing apparatus according to claim 3, wherein the searching section searches for the third image based on a predetermined range based on the number of faces in the user-selected image.

5. The image processing apparatus according to claim 1, wherein the associating section associates the image with the label.

6. The image processing apparatus according to claim 5, further comprising:
   a display control section controlling display of the found second image.

7. The image processing apparatus according to claim 6, wherein the searching section searches for a third image associated with a label similar to a label specified by an icon selected by a user.

8. The image processing apparatus according to claim 6, wherein the searching section searches for a third image associated with a label similar to a label associated with an image selected by a user.

9. An image processing method comprising using an image processing apparatus to perform the steps of:
   detecting, in a first image, a quantity of faces, a size of the faces, and a facing direction of the faces, the quantity being one or more than one;
   generating first metadata corresponding to the detection results;
   associating the first image with the first metadata;
   generating a label indicating a category of the first image based on the first metadata of the first image and a pre-determined reference value stored in the image processing apparatus, the reference value comprising a value range including a maximum value and a minimum value;
   receiving an input from a user, the input indicating a selection of the reference value;
   modifying the reference value by one of (1) increasing the maximum value while maintaining the minimum value or (2) maintaining the maximum value while decreasing the minimum value; and
   searching for a second image based on the modified reference value.

10. A computer readable medium tangibly recording a program executable by a computer, the program, when executed, causing the computer to perform a method comprising the steps of:
    detecting, in a first image, a quantity of faces, a size of the faces, and a facing direction of the faces, the quantity being one or more than one;
    generating first metadata corresponding to the detection results;
    associating the first image with the first metadata;
    generating a label indicating a category of the first image based on the first metadata of the first image and a pre-determined reference value stored in the image processing apparatus, the reference value comprising a value range including a maximum value and a minimum value;
    receiving an input from a user, the input indicating a selection of the reference value;
    modifying the reference value by one of (1) increasing the maximum value while maintaining the minimum value or (2) maintaining the maximum value while decreasing the minimum value; and
    searching for a second image based on the modified reference value.

11. An image processing apparatus comprising:
    a detecting unit that detects, in a first image, a quantity of faces, a size of the faces, and a facing direction of the faces, the quantity being one or more than one, the detecting unit generating first metadata corresponding to the detection results;
    an associating unit that associates the first image with the first metadata;
    a generating unit that generates a label indicating a category of the first image based on the metadata of the first image and a pre-determined reference value, the reference value comprising a value range including a maximum value and a minimum value; and
    a searching unit that searches for a second image based on the reference value specified by an icon selected by a user, the searching unit comprising a margin adder, wherein the margin adder performs one of (1) increasing the maximum value while maintaining the minimum value or (2) maintaining the maximum value while decreasing the minimum value.

* * * * *